2,926,084
DRY FEED FOR WEANING PIGS

Petrus J. Geerlings, Waterloo, Iowa

No Drawing. Application April 7, 1959
Serial No. 804,582

5 Claims. (Cl. 99—2)

This invention relates to compositions for an animal feed and more particularly to a dry meal for weaning pigs or other small animals at a very early age, and to the method employed in the weaning of pigs or other small animals using the composition of the invention. This application is a continuation-in-part of my copending application Serial No. 375,295, filed August 19, 1953, now abandoned.

In swine husbandry it has been the usual practice to permit small pigs to obtain nourishment from the sow until they attain 8 or 9 weeks of age, at which time they are weaned. Prior to this invention it was never considered possible to wean pigs with a dry feed until they had reached this age. In cases of necessity, when the sow failed to produce sufficient milk, or when the sow's milk was diseased, pigs weaned earlier than 8 weeks were fed whole cow's milk or liquid substitutes for sow's milk, which as a rule can be much more readily assimilated by the little pigs than a dry feed.

Liquid feeds, such as synthetic milks, have not met with commercial success primarily because they are too expensive. At least 70% of the liquid feed is water which has no food value. It is not economically feasible to use a feed of this kind. Furthermore, liquid feeds are troublesome to the farmer because special care is required in preparing the formulation and, of course, the slopping of pigs has always been a very distasteful task. Consequently, farmers have continued to follow the usual practice of leaving the pigs with the sow for the customary eight weeks before weaning, at which time the pigs are put on solid feed exclusively.

The meal of the present invention is designed to be fed conveniently to small pigs by making it available in self-feeders a short time before, and after, weaning in dry solid form right out of the container. It is a complete substitute for sow's milk from the time the pigs are about two weeks old. The feed has proved to be tremendously successful in producing high quality pork in a relatively short time and at a surprisingly low cost, much less than the cost incurred by weaning on synthetic milk substitutes or even by sow-feeding. Pigs weaned on my feed compositions outgain those left with the sow by about 15 pounds per pig at 8 weeks of age. By feeding pigs concentrated highly-fortified food at a very early age advantage is taken of the fact that the young animals convert food into pork far more efficiently than older animals. For example, a pig under 8 weeks of age will convert 2 pounds of my feed into one pound of pork, whereas an older pig will require 3 or 4 pounds of feed for each pound of pork produced.

Feeding small pigs a meal in dry form is flatly contrary to expert advice. It always has been the opinion of experienced farmers in this field that tiny pigs could not assimilate food unless it was taken in liquid form. Furthermore, it has always been concluded that there was no suitable substitute for milk with respect to nutritional value. It is surprising, therefore, that the dry meal compositions of my invention are not only assimilated by small pigs in dry form, but are palatable to the pigs without fancy flavoring. No difficulty is encountered in weaning the pigs at from 14 to 21 days of age, or when the pigs weigh approximately 10 pounds.

Because little pigs have very small stomachs, it is necessary to concentrate as much food value as possible into the feed. When the feed contains a large amount of water (sow's milk contains 80%), its nutritional value is reduced proportionately. Therefore, by feeding the pigs dry meal I have achieved the object of supplying a high energy, well fortified food in concentrated form. The success of the dry feed method in rapidly converting feed into pork affirms the validity of this theory.

The dry meal of this invention has the additional advantage, as previously suggested, of saving the farmer a tremendous amount of labor. He does not have to measure out liquid and solid ingredients and then mix them together. Too, the feed is much easier to handle because it is lighter and less is required. With dry feed one man can service about 500 pigs in the same time required to feed 50 pigs with liquid feed.

The meal of the invention comprises cereals, oil meal, vitamins, dried milk and trace minerals, which are the usual constituents in a pig meal, in admixture with a relatively large proportion of an antibiotic. I have found that by using an amount of antibiotic in my compositions far in excess of the maximum heretofore recommended in feed manuals and by veterinarians that small pigs can be weaned at a very early age and fattened in an amazingly short time. The growth and nutritional effect on the pigs is much superior to that resulting from leaving the pigs with the sow until they reach the age of 8 weeks. It appears from the experiments that I have made with weaning meal compositions that the increased concentration of antibiotic is especially effective in keeping the pigs in good health as well as in promoting rapid growth at a very early age. If the pigs get a good start, after the initial 8 weeks' period they continue not only to maintain their health and weight advantages, but to outgain pigs which have had a slow start.

The largest proportion, or about 45% to 65% by weight, of my meal composition consists of cereals such as ground rolled oats, ground yellow corn and flour middlings. The other ingredients and their relative proportions are as follows: dried milk from 15 to 50%; oil meal about 15%; vitamins 0.3% to 0.5%; minerals 3 to 5%; sugar 3 to 7%; antibiotic 40 to 250 grams per ton, or about .0044 to .0275%. A preferred composition contains in addition to the ingredients just mentioned from 5 to 200 pounds per ton (¼ to 10%) of dry yeast and less than 300 grams per ton (.03%) of arsanilic acid. The presence of the yeast and the arsanilic acid in combination imparts added vitality and nutrition to the meal, in addition to insurance against infection. This improvement is manifested in more rapid and less expensive gains, amounting to about 25% increased efficiency. Peculiarly, the arsanilic acid alone or the yeast alone are not as effective as the combination of the two. It is preferred that both be present, although it is not necessary to mix them separately before adding them to the other ingredients. The combination of yeast and arsanilic acid, especially when present in the feed with the large proportion of antibiotic, effectively destroys disease-producing bacteria and promotes the growth of healthy bacteria. The yeast may be of the moist variety that is normally sold in compressed form or it may be used in dry form. If the moist variety is used a sufficient amount should be employed to make up for the moisture present since the weights given are based upon dry yeast.

The cereals used in my compositions are those which are commonly employed in feeds of this kind and include oats, corn, wheat, rice, rye, barley, and other cereal grains and cereal grain by-products. The particular combination of cereals used is not critical but care should be taken to use those which are palatable and which provide the most nourishment. I prefer rolled oats, corn and wheat.

The dried milk, which may comprise from 15 to 50% of my feed, may be the end product resulting from dehydrating whey, buttermilk, skimmed milk or whole milk, or it may be a combination of dried milks obtained from any of these milk products. The oil meal may be derived from any suitable vegetable source such as soybean, linseed, cottonseed, peanut, as well as from animal and fish products. The vitamins comprise, for example, niacin, riboflavin, vitamins A and D, pantothenic acid, ascorbic acid. They may come from synthetic or natural sources. The minerals employed may comprise bonemeal, limestone and trace minerals, the latter being provided as such, and including manganese sulphate, copper sulphate, cobalt carbonate, nickel carbonate, stabilized potassium iodide, iron oxide, iron sulphate, zinc carbonate, sodium borate and tricalcium phosphate. The amount of these ingredients required by the animal is minute (they total about 0.15% of the weight of the feed), and consequently they are normally mixed together and added to the formula in a group called "trace minerals." I also prefer to add relatively large quantities of bonemeal and limestone so that the total proportion of minerals constitutes from 3 to 5% of the total weight of the feed.

To make the feed palatable and to supply ready energy, about 3 to 7% sugar, in the form of sucrose, dextrose, molasses, etc., is included in the feed composition. This amount is not critical, however. The cereals, milk, oil meal, vitamins, minerals and sugar are commonly used in feeds, and those skilled in the art of compounding feeds are thoroughly familiar with the relative proportions normally required and can readily compound such a feed. The invention resides in the addition to this more or less standard composition of an antibiotic in an amount greatly in excess of that normally prescribed as standard dosage for humans or animals. Furthermore, the addition of the yeast and arsanilic acid in combination provides an unexpectedly improved composition which is superior in its growth-stimulating properties to that of the meal which contains the antibiotic only.

The antibiotics which may be used in the feed compositions of my invention include streptomycin, terramycin, bacitracin, chloromycetin, neomycin, polymyxin, subtilin and aureomycin. All of these materials are well known and are commercially available. They are all prepared from cultures of various types and in some instances certain of these antibiotics may be synthesized. Their manufacture is disclosed in the literature, so it is not deemed necessary to describe them in detail.

The amount of antibiotic in the feed formulation may range from 40 to 250 grams per ton, and preferably from 75 to 125 grams per ton. The reference books in the feed industry specify that not more than 50 grams per ton of antibiotic be used in feeds for large pigs. More than this is apt to result in various ill effects on the animal, it is stated. It will be noted that the minimum amount of antibiotic used in my formulations is about the maximum normally recommended for tiny pigs, the 50 gram quantity being prescribed as the top limit for feeds for large pigs. However, I have found that in the case of pigs from 3 to 8 weeks of age, as high as 250 grams per ton may be used without any ill effects whatsoever. On the contrary, this greatly increased amount of antibiotic is responsible for surprisingly improved growth properties imparted to my feed. The most effective amount will vary somewhat from one antibiotic to the other, but the range specified as operable is for antibiotics generally.

As pointed out hereinabove, the antibiotic preferably is supplemented by the addition of yeast and arsanilic acid. The amount of yeast may vary from 5 to 200 pounds per ton (¼ to 10%) of feed, preferably from 50 to 75 pounds per ton (2.5 to 3.7%). The arsanilic acid must be present in an amount not in excess of 300 grams per ton and preferably not less than 25 grams per ton. If quantities much in excess of 300 grams are used the pigs get "drunk," and upon further increase may be killed.

The meal of my invention is most efficiently employed in converting little pigs into pork by following my novel method of feeding. Being a substitute for milk, the meal can be used as a complete replacement for sow's milk from the time the pigs are two weeks old. However, best results are obtained by weaning at three weeks. Younger pigs can be weaned on my meal if they are thrifty and weigh about 10 pounds or more. Unthrifty, underweight pigs may be fed one part of meal mixed with about five parts of warm water three times a day. My dry meal may be self-fed at the same time, and when the pigs have attained a weight of 10 pounds or more, the liquid feed may be discontinued entirely.

Normal pigs are started on dry meal at about 10 days of age by creep-feeding away from the sow. Water should be made available nearby and the pigs should be kept warm and dry. The pigs will consume the meal in proportion to the amount of milk they are getting from the sow and the number of pigs in the litter. At three weeks the pigs are separated from the sow regardless of the amount of meal they have been eating. Dry meal exclusively is then fed to the pigs for 10 days. At the end of this period, normal pigs are 31 days old and will weigh about 16 pounds. The meal may then be reduced with less expensive feed, as for example in accordance with the following formulation.

| Ingredients: | Parts by weight |
| --- | --- |
| Meal of the invention | 200 |
| Standard pig meal | 100 |
| Cracked or ground corn | 200 |
| Ground oat meal | 200 |
| | 700 |

Standard pig meal costs about 50% and corn costs about 25% of the cost of the weaning meal of the invention. Thus, it is apparent that this formulation is considerably less expensive than the meal of the invention. This mixture is provided for the pigs in self-feeders for an additional 21-day period. From age 52 to 56 days, the weaning meal may be discontinued completely and a mixture of standard pig meal and ground corn substituted therefor. At age 56 days, the pigs will weigh an average of 40 pounds and will continue to grow rapidly on standard feeds from this point on.

A specific example which illustrates a feed formulation made in accordance with this invention follows. Modifications in the formula will be apparent, and it is not intended that my invention be limited to the particular ingredients or proportions set forth other than by the scope of the appended claims. The ingredients listed are mixed in any order to form a dry homogeneous mixture.

| Ingredient: | Parts by weight |
| --- | --- |
| Cereal | 1100 |
| Oil meal | 100 |
| Fish meal | 100 |
| Dried milk | 400 |
| Sugar | 110 |
| Bonemeal, limestone or other calcium salts | 64 |
| Vitamins A and D (dry) | 10.8 |
| Trace minerals | 3 |
| Yeast (dried) | 60 |
| Arsanilic acid | 0.2 |
| Aureomycin compound (0.4% aureomycin in inert carrier) | 50 |

The dry meal thus produced was creep-fed to a group of pigs beginning at the age of 10 days to supplement the milk they were getting from the sow. At 3 weeks the pigs averaged 10 pounds each. They were then separated from the sow and fed this dry meal exclusively for a period of ten days. At the end of 31 days the concentration of the meal was reduced by mixing 2 parts thereof with 5 parts of a mixture of less expensive prepared pig meal, ground rolled oats and ground corn, this mixture being fed to the pigs for the next 21 days. After the 52-day period, the weaning meal was discontinued completely and the diet was changed to a mixture of a standard pig meal and corn, fed free choice in separate feeders. At the end of 8 weeks, the normal weaning time, the pigs averaged 40 pounds each in weight.

A second group of pigs taken from the same herd were raised under identical conditions except with respect to the manner of feeding. This group was left with the sow for the usual 8 weeks, their diet being supplemented by prepared pig meals which contain all of the ingredients included in the meal of the invention except the increased quantity of aureomycin and the combination yeast and arsanilic acid. At the end of 8 weeks these pigs weighed 25 pounds each, which is considered the national average. A careful account was kept of the cost involved to feed both groups of pigs. This cost data indicated that pigs fed on the weaning meal and in accordance with the method of this invention cost 50% less per pound of pork produced than pigs weaned at the usual 8 weeks and fed in the usual manner on sow's milk supplemented with pig meal. The additional feed required for the sow while suckling the pigs, and the loss in weight of the sow during the suckling period were considered in arriving at the 50% figure.

In addition to the cost advantage mentioned, there is another important advantage in employing the weaning meal of this invention over sow-feeding. A sow which has suckled pigs for only three weeks may be rebred much earlier so that three instead of two litters per year are possible. If it is desired to market the sow, this may be done earlier if the pigs are weaned at 3 weeks instead of 8 because the sow can be put into top condition much sooner.

It appears from the many experiments that I have made on the weaning meal compositions described in this specification that the increased concentration of antibiotic is remarkably effective in keeping the pigs in good health and free of bacteria and diseases caused thereby, which promotes rapid growth at a very early age. Because the pigs get a much better start, after the initial 8 weeks period they continue to maintain the early weight advantage over pigs weaned at the usual time and consequently are ready for the market much earlier than these pigs.

It may be seen that the invention not only provides a method of producing pork much faster at a much lower cost than conventional methods, but in addition results in tremendous labor-saving to the farmer.

Although my invention is illustrated by its effect upon pigs, it will be understood that the composition and its method of use is also suitable for weaning calves, lambs and colts.

What I claim as new and desire to secure by Letters Patent of the United States is:

1. A dry meal for feeding young pigs characterized by its rapid growth-producing effect comprising cereal, oil meal, dried milk and minerals in admixture with from 40 to 250 grams of an antibiotic, 25 to 300 grams of arsanilic acid, and from 5 to 200 pounds of yeast per ton of meal.

2. A dry meal for feeding young pigs characterized by its rapid growth-producing effect comprising cereal, oil meal, dried milk and minerals in admixture with from 75 to 125 grams of an antibotic, 25 to 300 grams of arsanilic acid, and from 5 to 200 pounds of yeast per ton of meal.

3. A dry meal for feeding young pigs characterized by its rapid growth-producing effect comprising cereal, oil meal, dried milk, vitamins, sugar and minerals in admixture with from 75 to 125 grams of an antibiotic 25 to 300 grams of arsanilic acid, and from 50 to 75 pounds of yeast per ton of meal.

4. The composition of claim 1 in which the antibiotic is aureomycin.

5. The composition of claim 1 in which the antibiotic is terramycin.

References Cited in the file of this patent

UNITED STATES PATENTS

| | | |
|---|---|---|
| 2,536,438 | Grelck | Jan. 2, 1951 |
| 2,606,200 | Matson et al. | Aug. 5, 1952 |
| 2,619,420 | Jukes | Nov. 25, 1952 |
| 2,703,285 | Luther | Mar. 1, 1955 |

OTHER REFERENCES

Commercial Solvents, "Baciferm-5 Antibiotic Feed Supplement," Dec. 14, 1950, 2 pages.

Luecke et al.: Journal of Animal Science, vol. 10, May 1951, 5 pages.